A. C. PARTRIDGE.

Improvement in Photograph-Mounts.

No. 5,144. Reissued Nov. 12, 1872.

Witnesses
Sam^l M. Barton
M. J. Hogan

Inventor
Asa C. Partridge
by his atty
Carroll D. Wright

AM. PHOTO-LITHOGRAPHIC CO. N.Y. (OSBORNE'S PROCESS.)

UNITED STATES PATENT OFFICE.

ASA C. PARTRIDGE, OF BOSTON, MASSACHUSETTS.

IMPROVEMENT IN PHOTOGRAPH-MOUNTS.

Specification forming part of Letters Patent No. 127,705, dated June 11, 1872; antedated June 1, 1872; reissue No. 5,144, dated November 12, 1872.

*To all whom it may concern:*

Be it known that I, ASA C. PARTRIDGE, of Boston, in the county of Suffolk and State of Massachusetts, have invented certain new and useful Improvements in Photograph-Mounts, to be used with a clamp or spring-back portfolio; and I do hereby declare that the following is a full, clear, and exact description thereof, that will enable others skilled in the art to which it appertains to make and use the same, reference being had to the accompanying drawing and to the letters of reference marked thereon, which form a part of this specification.

Figure 1:
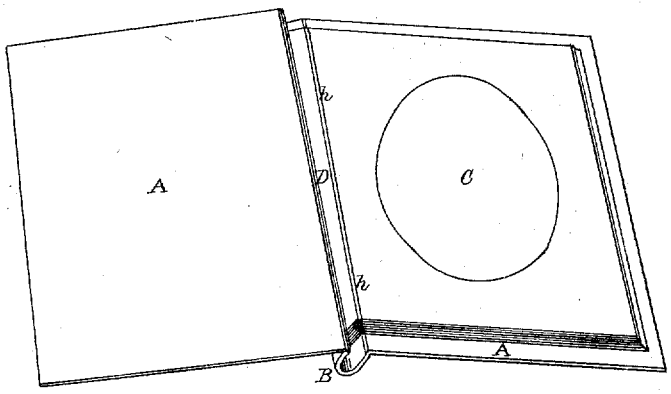
Figure 2:
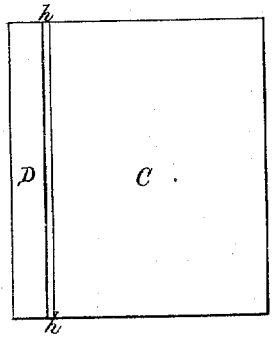
Figure 3:
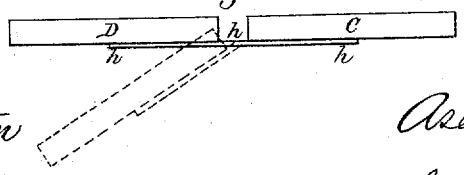

Figure 1 is a perspective view of a spring-back portfolio lying open, and having a number of my improved mounts inserted. Fig. 2 is a view of a single mount detached from the portfolio. Fig. 3 is a top view on a larger scale, showing the hinge or flexible joint.

The same letter indicates the same part in all the figures.

The nature of my invention consists in making a photograph-mount, or a mount for album-leaves, music-sheets, engravings, &c., with a hinge or flexible joint connecting the body of the mount with a counterfoil or stub, such stub being intended for insertion in the clamp or spring-back of a portfolio. The object of the invention is to facilitate the insertion of photographic pictures, album-leaves, music-sheets, engravings, &c., in a prepared cover or portfolio, and their removal therefrom at will, affording the ready means of protecting them from injury, and of enlarging or diminishing the number held in a single cover, or changing the arrangement of the pictures, or sheets, leaves, &c., at pleasure.

In the drawing, A A indicate the sides of the portfolio; B, the spring back or clamp; C, the body of the photograph-mount, or a mount for album-leaves, music-sheets, engravings, &c.; D, the stub or counterfoil; and *h*, the hinge or flexible joint which connects the stub with the body of the mount. This hinge may be made of cloth or any suitable flexible material.

To attach the mount it is only necessary to open the spring back or clamp and insert the stub. The spring being released, at once clamps and holds it firmly in place. As many pictures, leaves, sheets, &c., can thus be inserted as the back will hold, and they or any of them can be removed and replaced at pleasure.

Having thus fully described my invention, what I claim, and desire to secure by Letters Patent, is—

A mount for photographs, album-leaves, music-sheets, engravings, &c., having a stub or counterfoil attached to it by a flexible joint or hinge, in the manner and for the purpose described.

In testimony that I claim the foregoing I have hereunto set my hand.

ASA C. PARTRIDGE.

Witnesses:

CARROLL D. WRIGHT,

SAML. M. BARTON.